(12) United States Patent
Klümper

(10) Patent No.: US 8,451,573 B1
(45) Date of Patent: May 28, 2013

(54) OVERVOLTAGE PROTECTION DEVICE FOR A WIND TURBINE AND METHOD

(75) Inventor: Stephan Klümper, Gronau/Westfalen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/404,885

(22) Filed: Feb. 24, 2012

(51) Int. Cl.
*H02H 3/20* (2006.01)
*H02H 9/04* (2006.01)
*H02H 7/04* (2006.01)

(52) U.S. Cl.
USPC ............................................. 361/91.1; 361/35

(58) Field of Classification Search
USPC ........................................................ 361/91.1
See application file for complete search history.

(56) References Cited

U.S. PATENT DOCUMENTS

| 6,021,035 | A | * | 2/2000 | Larsen et al. | 361/54 |
| 2004/0145188 | A1 | * | 7/2004 | Janssen et al. | 290/44 |
| 2009/0185105 | A1 | * | 7/2009 | Hasegawa | 349/61 |

* cited by examiner

*Primary Examiner* — Dharti Patel
(74) *Attorney, Agent, or Firm* — Global Patent Organization; Douglas D. Zhang

(57) ABSTRACT

An overvoltage protection device for protecting a wind turbine against overvoltage is provided. The overvoltage protection device includes an electrical transformer for transforming electrical power generated by a wind turbine generator from a low-voltage region to a medium-voltage region. The electrical transformer includes at least one secondary winding electrically connected to the generator of the wind turbine, at least one primary winding electrically connected to an electrical utility grid receiving the generated electrical power, and at least one counter-winding for receiving a counter-current. A winding direction of the counter-winding is opposite to a winding direction of at least one of the primary winding and the secondary winding. Furthermore, a detection unit for detecting overvoltage at the transformer, a determination unit for determining the counter-current on the basis of the detected overvoltage, and a current driver unit for flowing the counter-current through the counter-winding are provided.

20 Claims, 6 Drawing Sheets

OVERVOLTAGE PROTECTION DEVICE FOR A WIND TURBINE AND METHOD

BACKGROUND OF THE INVENTION

The subject matter described herein relates generally to methods and systems for wind energy production, and more particularly, to an overvoltage protection device and a method for protecting a wind turbine against overvoltage.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

When a wind turbine is connected to the electrical utility grid, voltage variations of the grid may have an influence on electrical components installed at the wind turbine. In particular, overvoltage events occurring in the utility grid may be an issue for auxiliary wind turbine components. Auxiliary wind turbine components may have specific voltage ratings which are lower than voltage levels present during overvoltage events in the grid. It is thus desirable to keep the voltage level in a range which is not harmful for electrical and/or auxiliary wind turbine components.

BRIEF DESCRIPTION OF THE INVENTION

In one aspect, an overvoltage protection device for protecting a wind turbine against overvoltage is provided. The wind turbine includes an electrical transformer for transforming electrical power generated by a generator of the wind turbine from a low voltage region to a medium voltage region, the transformer including a secondary winding electrically connected to the generator of the wind turbine, a primary winding electrically connected to an electrical utility grid receiving the generated electrical power; and wherein the overvoltage protection device includes a detection unit for detecting overvoltage at the transformer; a determination unit for determining the countercurrent on basis of the detected overvoltage; at least one counter-winding for receiving a countercurrent, a winding direction of the counter-winding being opposite to a winding direction of at least one of the primary winding and the secondary winding; and a current driver unit for flowing the determined countercurrent through the at least one counter-winding.

In another aspect, a wind turbine is provided including an electrical transformer for transforming electrical power generated by a generator of the wind turbine from a low voltage region to a medium voltage region, the transformer including a secondary winding electrically connected to the generator of the wind turbine, a primary winding electrically connected to an electrical utility grid receiving the generated electrical power, and at least one counter-winding for receiving a countercurrent, a winding direction of the counter-winding being opposite to a winding direction of at least one of the primary winding and the secondary winding; a detection unit for detecting overvoltage at the transformer; a determination unit for determining the countercurrent on basis of the detected overvoltage; and a current driver unit for flowing the determined countercurrent through the at least one counter-winding.

In yet another aspect, a method for protecting a wind turbine against overvoltage, the method including transforming electrical power generated by a generator of the wind turbine from a low voltage region to a medium voltage region by means of an electrical transformer; detecting overvoltage at the electrical transformer; and applying at least one countercurrent at the electrical transformer such that the detected overvoltage is reduced to a predetermined voltage level.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that provides protection against overvoltages. More specifically, an overvoltage protection device is provided which may be used for protecting the wind turbine with respect to overvoltage events. It is thus possible to provide a voltage level in a range which is not harmful for electrical and/or auxiliary wind turbine components even though overvoltage may be present at the electrical utility grid to which the wind turbine is connected.

As used herein, the term "overvoltage" is intended to be representative of a voltage level which exceeds a predetermined voltage level such as a reference voltage level. This reference voltage level may be set according to maximum voltage level which may be applied at electrical and/or auxiliary components of the wind turbine. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
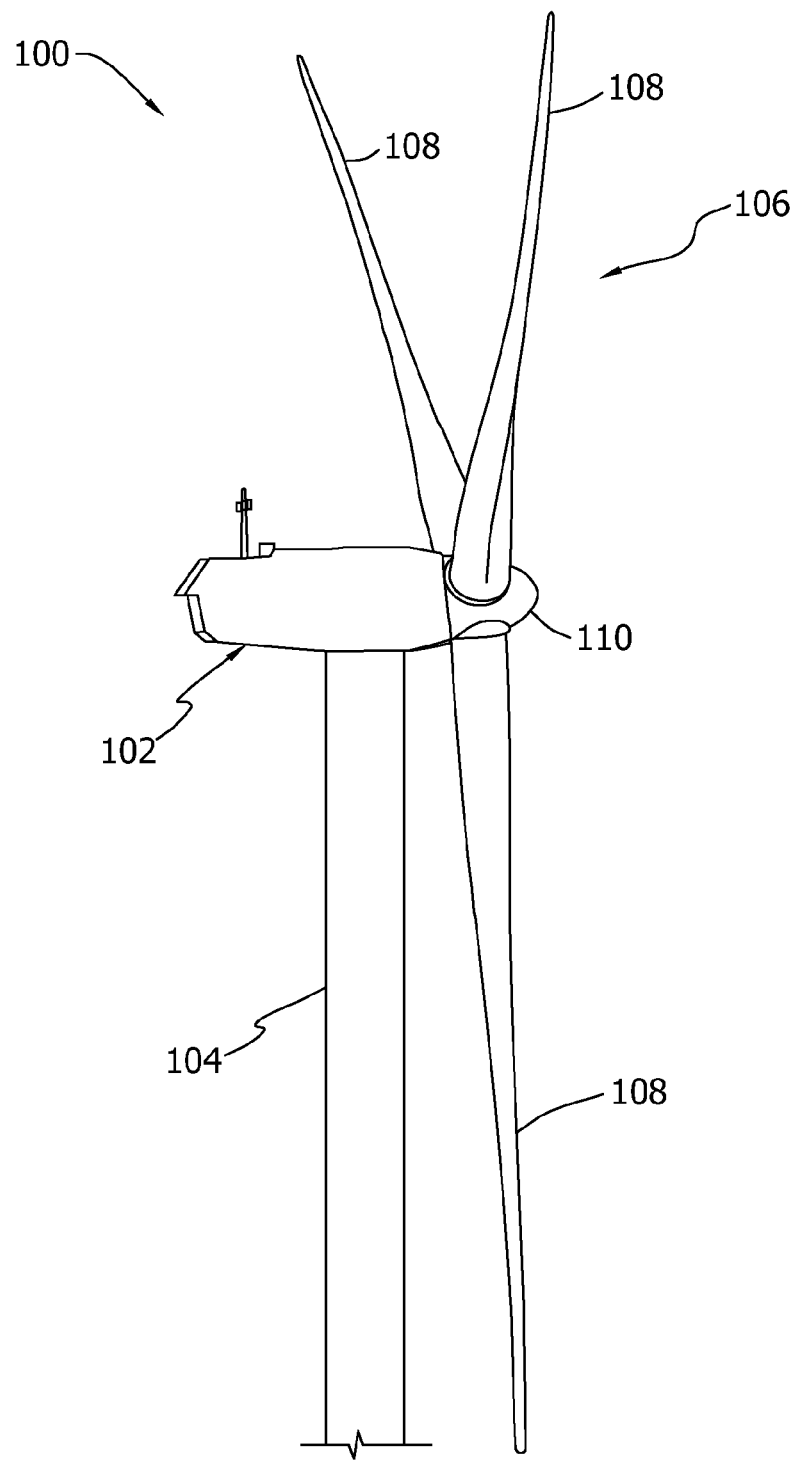
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
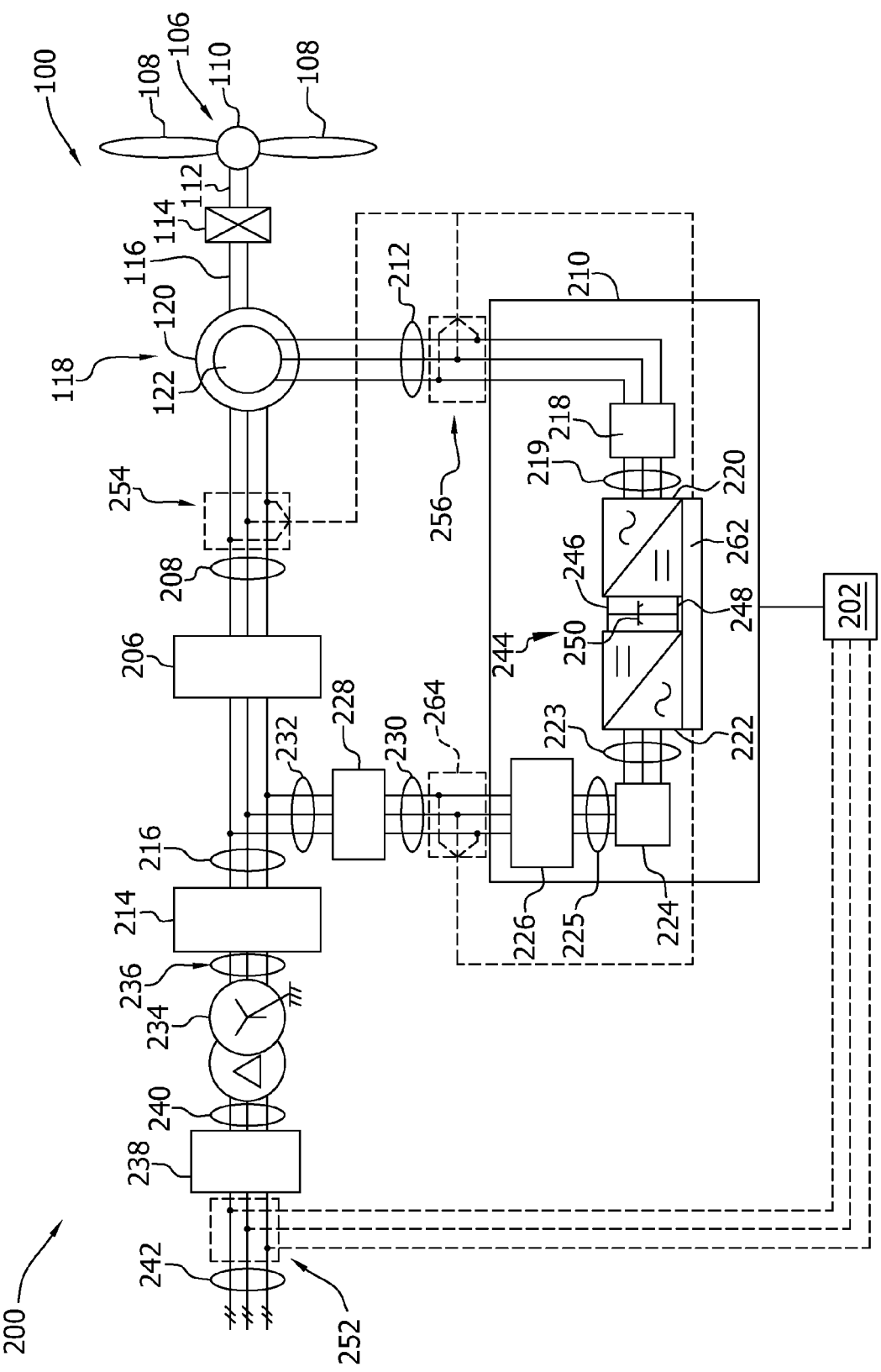
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instruction's that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
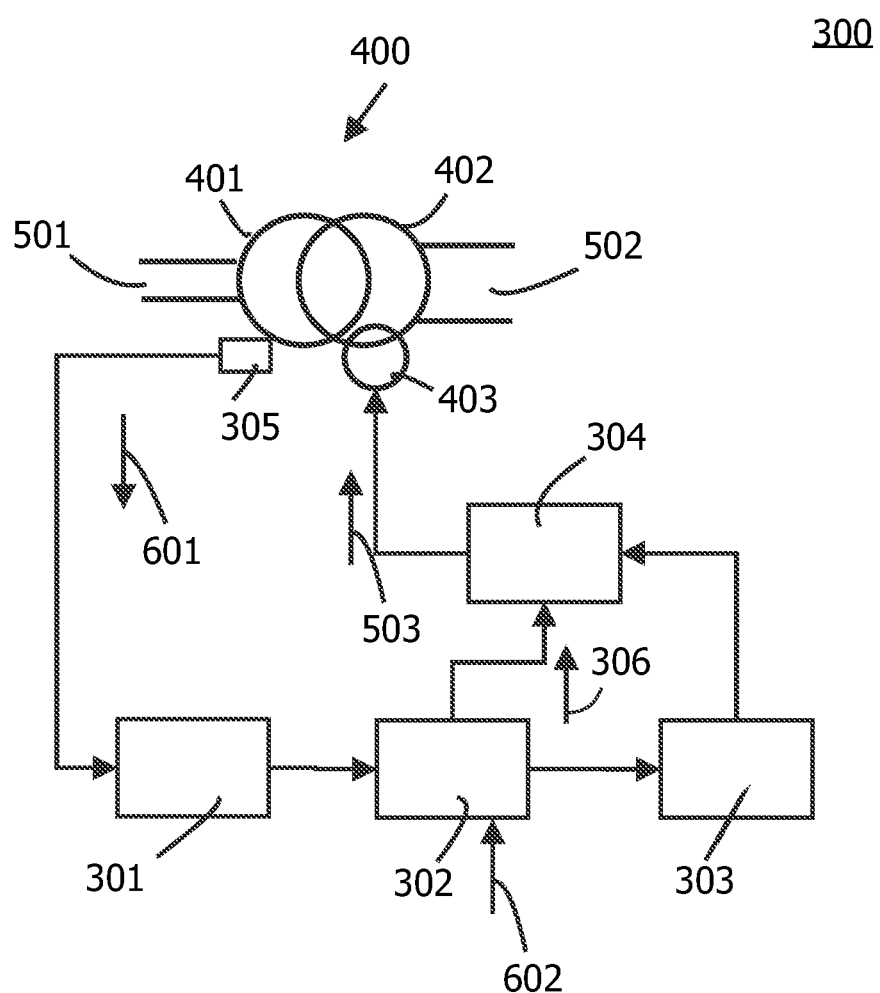
FIG. 3 is a schematic block diagram of an overvoltage production for protecting a wind turbine against overvoltage, according to a typical embodiment.

FIG. 3 is a schematic block diagram illustrating an overvoltage protection device for protecting a wind turbine against overvoltage, according to a typical embodiment. As shown in FIG. 3, an electrical transformer 400 of the overvoltage protection device 300 includes a primary winding 401 and a secondary winding 402. Primary power at primary side 501 is applied at the primary winding 401, wherein a secondary power at secondary side 502 is applied at the secondary winding 402. It is noted here, though not limited to this configuration, that the primary power is provided at a medium voltage range, the medium voltage level having a range from approximately 10 kV (kilovolts) to 40 kV. The medium voltage range is provided, e.g. at sub-strings of a wind farm including a number of wind turbines. The secondary power may be provided in a low-voltage range, according to a typical embodiment which can be combined with other embodiments described herein. The low-voltage level typically ranges from 500 V (volts) to 1000 V, and typically amounts to 690 V.

Though not limited to this configuration, the electrical transformer 400 of the overvoltage protection device 300 is designed such that the primary winding 401 is provided at the side of a utility grid, wherein the secondary winding 402 is provided at the side of the wind turbine generator 118 (see FIG. 2).

According to a typical embodiment which may be combined with other embodiments described herein, the overvoltage protection device 300 includes a voltage sensor 305 for detecting overvoltage 601 and at least one counter-winding 403 for receiving a counter-current 503, wherein the winding direction of the counter-winding 403 is opposite to a winding direction of at least one of the primary winding 401 and the secondary winding 402. In the following, it will be explained how the counter-current 503 which is flowing through the counter-winding 402 is controlled such that over-voltage detected by the voltage sensor 305 is eliminated or at least reduced at the secondary side 502 of the electrical transformer 400 which is connected to the wind turbine generator 118 and auxiliary components.

The overvoltage 601 which is measured by the voltage sensor 305 is applied at a detection unit 301 which in turn is connected to a determination unit 302. The detection unit 301 which is operatively connected to the voltage sensor 305 provides a measure for an overvoltage event occurring at the electrical transformer 400. It is noted here, though not shown in FIG. 3, that the detection of the overvoltage may also be provided at the utility grid to which the primary winding 401 is connected. Then, an overvoltage event within the electrical utility grid may be detected and respective information may be sent to the determination unit 302. At the determination unit 302, a reference voltage level 602 is provided such that the determination unit 302 is capable of comparing a level of the detected overvoltage 601 with the reference voltage level 603. Thereby, detecting the overvoltage 601 at the electrical transformer 400 may include comparing the measured voltage level with the reference voltage level 602. The overvoltage 601, which is detected, may be defined in a range from 120% to 180% of a nominal voltage at the electrical transformer 400, or at the electrical utility grid, if the overvoltage is measured at the electrical utility grid.

An output signal of the determination unit 302 is sent to a current driver unit 303 which is designed for providing the counter-current 503 which is applied at the counter-winding 403. If an overvoltage event is detected by the cooperation of the voltage sensor 305 and the detection unit 301, a switching unit 304, which is connected to the current driver unit 303, provides a fast switching of the counter-current 503 such that the counter-current 503 may flow through the counter-winding 403. A magnetic flux provided by this counter-current 403 at a secondary side of the electrical transformer 400 thus reduces the magnetic flux induced by the overvoltage event and thus may reduce or eliminate overvoltages applied at the wind turbine generator 118 and/or other electrical components/auxiliaries of the wind turbine.

As used herein, the term "counter-current" is intended to be representative of the current which is flown through the counter-winding and thus produces a magnetic flux in a counter- or contra-direction. Thus, an overvoltage, which may be represented by a voltage level which exceeds a predetermined voltage level, e.g. which exceeds the reference voltage level 602, may be reduced. The reference voltage level 602 may be set in accordance with a maximum voltage level which may be applied at electrical and/or auxiliary components of the wind turbine without causing damage due to too high a voltage. It is thus possible to keep the voltage within a certain range where auxiliary components may operate without damage. This may lead to a continuous normal operation without damaging components that are connected to the mains.

The overvoltage protection device 300 for protecting a wind turbine against overvoltage 601 according to a typical embodiment described herein includes the electrical transformer 400 for transforming electrical power generated by the wind turbine generator 118 from a low-voltage region LV to a medium-voltage region MV. The electrical transformer 400 includes the secondary winding 402 electrically connected to the wind turbine generator 118, the primary winding 401 electrically connected to the electrical utility grid receiving the generated electrical power and at least one counter-winding 403 for receiving the counter-current 503. The winding direction of the counter-winding 403 is opposite to a winding direction of at least one of the primary winding 401 and the secondary winding 402. The arrangement of the primary and secondary windings 401, 402 with respect to the counter-winding 403, and the winding directions thereof, will be explained in detail with respect to FIGS. 4 and 5. In addition to that, the overvoltage protection device 300 includes the detection unit 301 for detecting overvoltage 601, e.g. at the electrical transformer 400. Furthermore, the determination unit 302 is provided for determining the counter-current 503 on the basis of the detected overvoltage 601. Then, the current driver unit 303 is able to direct the counter-current 503 of an appropriate level through the counter-winding 403.

According to a typical embodiment not shown in FIG. 3, the counter-winding 403 may be provided at a primary side of the electrical transformer 400. In addition to that, or alternatively, the counter-current 503 may be applied at the electrical transformer 400 at a predetermined time delay after an occurrence of the overvoltage event. According to a typical embodiment, the time delay may be in a range from 0.5 ms (milliseconds) to 100 ms. In addition to that, or alternatively, applying the counter-current 503 at the electrical transformer 400 may include adjusting amplitude characteristics of the counter-current 503, e.g. an amplitude level of the counter-current 503 may vary during the application of the counter-current 503 at the counter-winding 403. In addition to that, or alternatively, applying the counter-current 503 at the electrical transformer 400 may include providing a pulsed counter-current 503.

Figure 4:
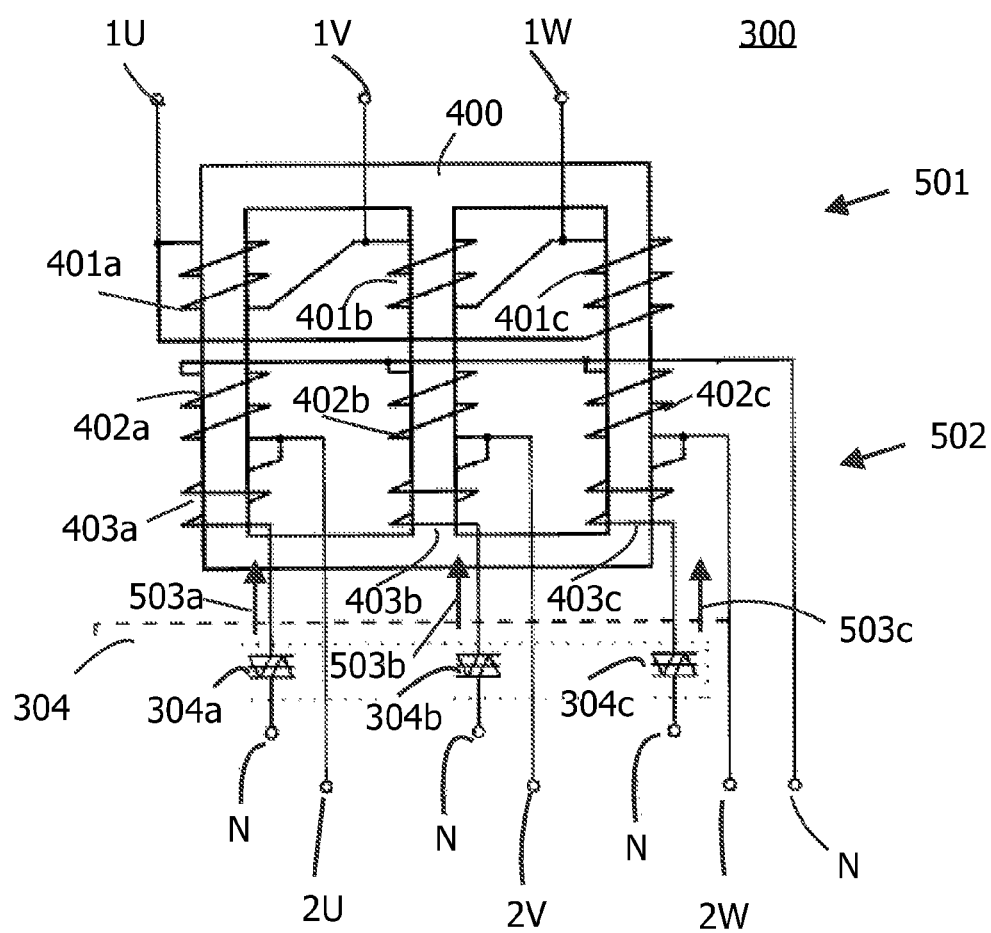
FIG. 4 is a detailed view of an electrical transformer having an overvoltage protection device at a secondary side, according to another typical embodiment.

FIG. 4 is a detailed view of an overvoltage protection device 300 for a three-phase transformer 400 having three primary windings 401a, 401b, 401c and three secondary windings 402l, 402b, 402c. In order to provide an overvoltage compensation for the three phases, three counter-windings 403a, 403b, 403c are provided at a secondary side 502 of the electrical transformer. It is noted here that a primary side 501 of the electrical transformer at the side of the electrical utility grid, i.e. the primary side 501 of the electrical transformer 400, is connected to electrical components of the utility grid via terminals 1U, 1V and 1W. On the other hand, the secondary side 502 is connected to e.g. a converter of the wind turbine and/or other electrical auxiliary components of the wind turbine. For these electrical connections, terminal 2U, 2V, 2W and N are provided.

The respective counter-windings 403a, 403b, 403c, which are provided at the secondary side 502 of the electrical transformer 400, are respectively connected between the output terminals 2U, 2V, 2W, and a respective switching unit 304a, 304b, 304c associated with the counter-windings 403a, 403b, 403c, respectively. A second connection of the switching units 304a, 304b, 304c is connected to the terminal N at the secondary side 502 of the electrical transformer 400.

As shown in FIG. 4, at the secondary side 502 of the electric transformer 400, the counter-windings 403a, 403b, 403c exhibit a winding direction which is opposite to a winding direction of the associated secondary winding 402a, 402b, 402c. The respective switching units 304a, 304b, 304c respectively obtain a trigger signal 306 from the determination unit 302 (not shown in FIG. 4).

It is noted here that a ratio of winding numbers has an influence on the elimination or reduction of an overvoltage event. In other words, a ratio of the winding number of the counter-winding 403a, 403b, 403c with respect to the winding number of the secondary winding 402a, 402b, 402c may be provided such that a given counter-current 503a, 503b, 503c may provide an effective overvoltage reduction or elimination.

Thus, the three-phase AC transformer includes an additional winding at each phase. This winding is wound in a contra-direction (counter-direction) to the related mains winding. During normal operation, this additional windings are not used, and no current is flown through these windings. During the detection of overvoltage peaks by the measurement device, which may be provided as a grid-monitor, those windings are switched to the neutral connection N by means of a semiconductor circuit. The timing to switch on/off is critical in order to avoid high current peaks. Due to the contra-direction of the transformer winding, the magnetic field inside the transformer will be reduced by the reversed field. During this process, the voltage reduced at the secondary winding will be reduced by a specified x-voltage. This will lead to an AC clipping during high-voltage events on the mains. Thus, this kind of winding design may limit an overvoltage directly at the origin and is able to operate in a short time such as a few milliseconds.

According to the set-up shown in FIG. 4, the electrical transformer is a three-phase transformer, and an individual counter-winding 403a, 403b, 403c is provided for each phase of the transformer 400. The at least one switching device 304a, 304b, 304c may include electrical switches selected from the group consisting of a triac, an IGBT, a bipolar transistor, a thyristor, a MOS-FET, a SiC-JFET, a unipolar transistor, an avalanche-diode, a switching-diode, a Schottky-diode and any combination thereof. Thus, a counter-current may be applied at the electrical transformer individual for the three phases of the electrical transformer 400. In addition to that, the counter-current may be adjusted individually for the three phases of the electrical transformer 400, i.e. the respective counter-currents 503a, 503b, 503c may be different for the three phases.

Figure 5:
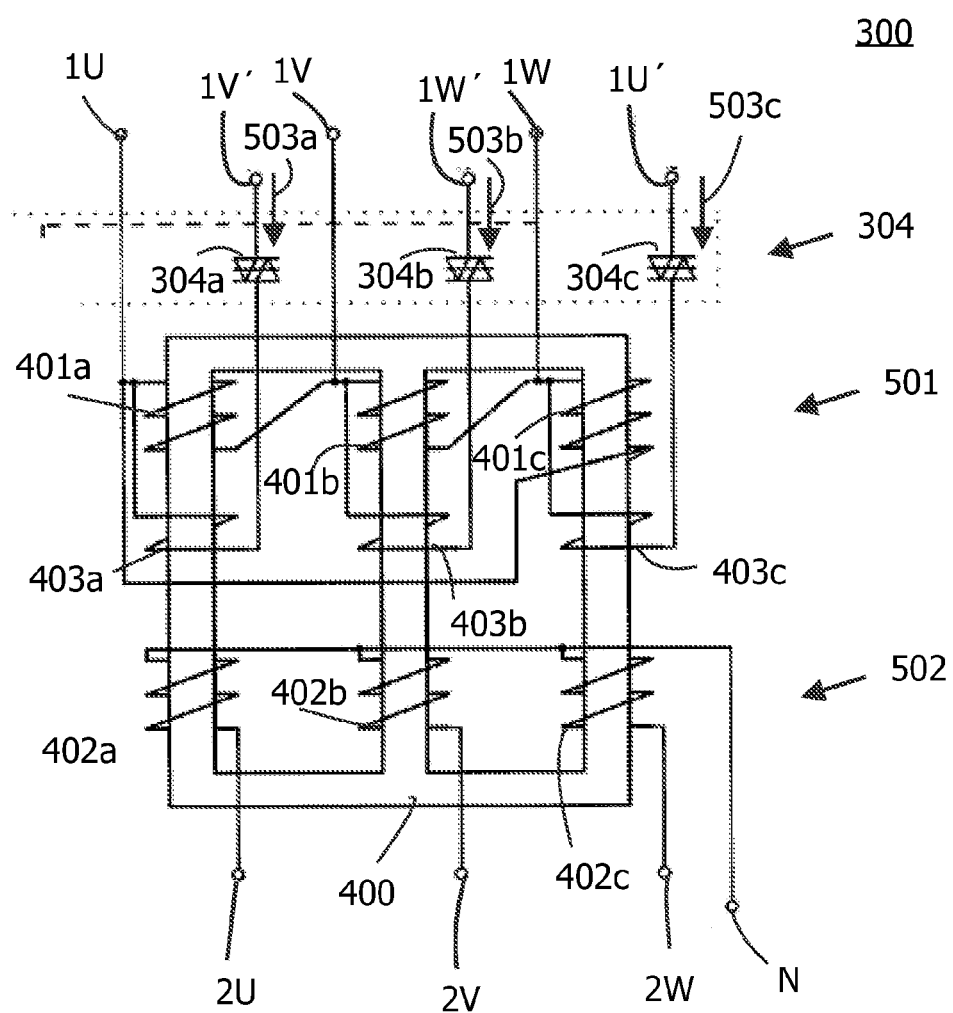
FIG. 5 is a detailed view of an electrical transformer of an overvoltage protection device at the primary side of the transformer coils, according to yet another typical embodiment.

FIG. 5 is a detailed view of an overvoltage protection device 300 according to another typical embodiment. As shown in FIG. 5, counter-windings 403a, 403b, 403c for a three-phase transformer 400 are provided at a primary side 501 of the transformer 400. As the primary side of the transformer 400 is connected to the medium voltage range MV, i.e. a voltage range from approximately 10 kV to 40 kV, the counter-current 503a, 503b, 503c which is flown through the counter-windings 403a, 403b, 403c is reduced as compared to the overvoltage protection device 300 which has been described herein above with respect to FIG. 4. This is due to the fact that magnetic flux can be provided using less counter-current, because the voltage at the primary side 501 is higher than the voltage at the secondary side 502 (low-voltage LV region).

As in the embodiment described with respect to FIG. 4, the overvoltage protection device 300 shown in FIG. 5 has the electrical transformer 400 for transforming electrical power generated by the wind turbine generator 118 from the low-voltage region LV to the medium-voltage region MV. The transformer includes at least one secondary winding 402a, 402b, 402c which are adapted to be connected to the wind turbine generator 118 and auxiliary components of the wind turbine, and at least one primary winding 401a, 401b, 401c which are adapted to be connected to the electrical utility grid receiving the electrical power generated by the wind turbine. Thereby, the wind turbine generator 118 (FIG. 2) and/or auxiliary electrical components of the wind turbine may be connected at the connection terminals of the secondary windings 402a, 402b, 402c, which are indicated by reference numerals 2U, 2V, 2W and the neutral point N. The electrical connection to the electrical utility grid receiving the generated electrical power are denoted by reference numerals 1U, 1V, 1W.

In the case shown in FIG. 5, i.e. in the case where the counter-windings 403a, 403b, 403c are located at the primary side 501 of the electrical transformer 400, the switching units 304a, 304b, 304c are connected between the respective connection points to the utility grid and connection terminals 1V', 1W' and 1U'. In other words, a first switching unit 304a for a first case of the three-phase transformer 400 is connected between the connection terminals 1U and 1V', a second switching 304b is connected between connection terminals 1V and 1W', and a third switching unit 304c is connected between connection terminals 1W and 1U'.

As in the overvoltage protection device 300 described herein above with respect to FIG. 4, the overvoltage protection device 300 shown in FIG. 5 provides counter-windings 403a, 403b, 403c which are wound in an opposite direction with respect to the transformer windings, in this case the primary windings 401l, 401b, 401c. In other words, a first counter-winding 403a for receiving a first counter-current 503a has a winding direction which is opposite to the winding direction of the first primary winding 401a. The same applies for second and third counter-windings 403b, 403c respectively. Thus, the second counter-winding 403b receiving a second counter-current 503b is wound in a winding direction which is opposite to the winding direction of the second primary winding 401b, and the third counter-winding 403c receiving a third counter-current 503c is wound in a winding direction which is opposite to the winding direction of the third primary winding 401c.

As in the set-up shown in FIG. 4, the respective switching units 304a, 304b, 304c receive a trigger signal 306 which has been described herein above with respect to FIG. 3. When a trigger signal is present, the switching units 304a, 304b, 304c may connect the counter-windings to a supply voltage. Otherwise, i.e. without the trigger signal 306, the counter-windings are switched off and a normal operation of the electrical transformer 400 is provided. Thus, the trigger signal 306 is only provided in case of an overvoltage event, i.e. if it is determined that an overvoltage applied the electrical transformer 400 and/or occurring in the electrical utility grid, is above a predetermined level, i.e. above a preference level which has been set in order to avoid a damage to electrical and/or auxiliary components within the wind turbine.

Figure 6:
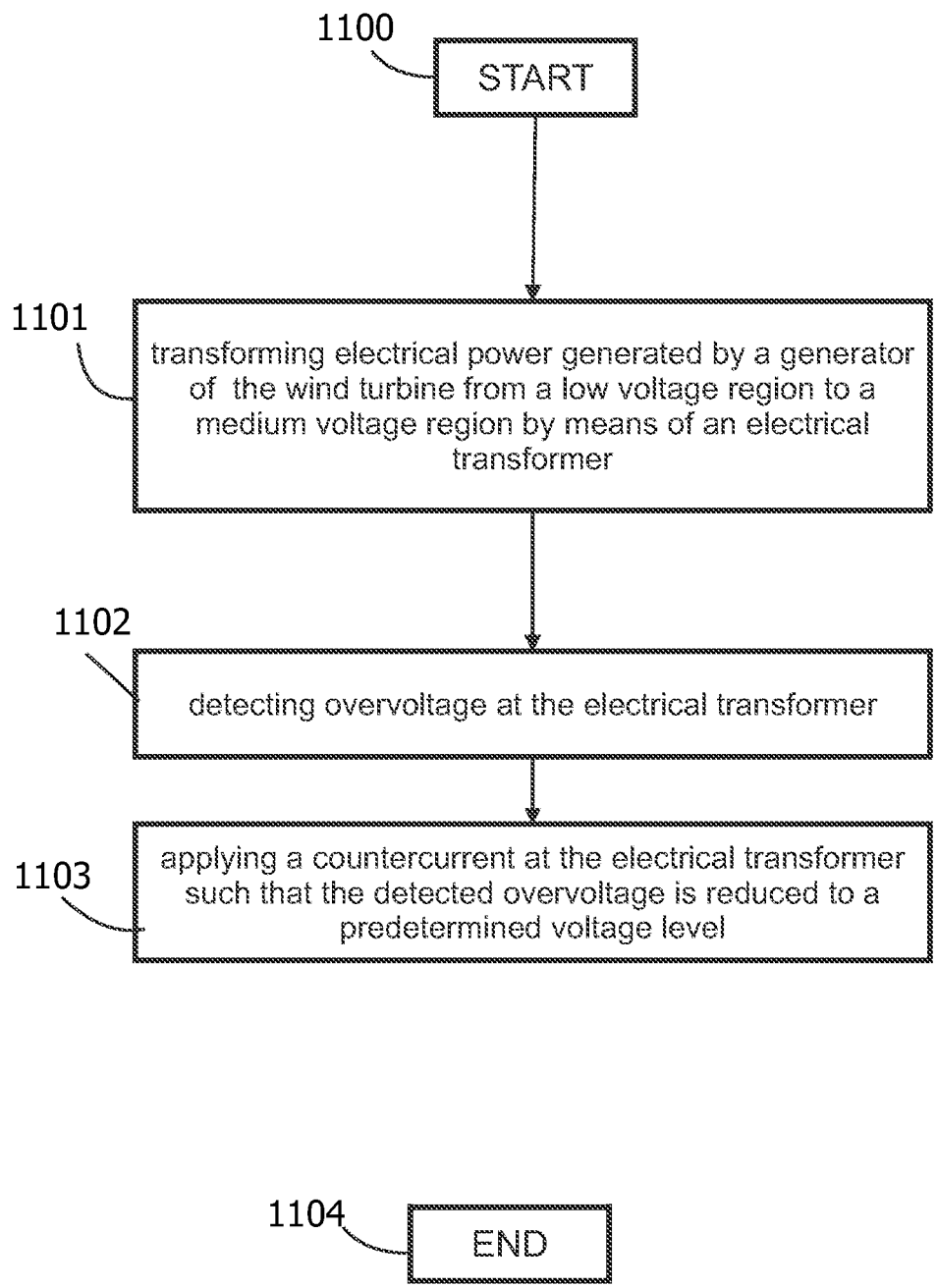
FIG. 6 is a flowchart illustrating a method for protecting a wind turbine against overvoltage.

FIG. 6 is a flowchart illustrating a method for protecting a wind turbine against overvoltage. At a block 1100, the procedure is started. Then, electrical power is generated by the wind turbine generator 118 and is transformed from a low-voltage region LV to a medium-voltage region MV by means of the electrical transformer 400 (block 1101). Furthermore, overvoltage may be detected at the electrical transformer and/or at the electrical utility grid connected to a primary side 401 of the electrical transformer 400 (block 1102). If an overvoltage 601 is detected at block 1102, a counter-current 503 is applied at the electrical transformer 400 such that the detected overvoltage 601 is reduced to a predetermined voltage level (block 1103). The procedure is ended at block 1104.

The above-described devices and methods facilitate an overvoltage protection of wind turbine components. In particular, the installation of power generation utilities at grid networks may be provided which are exposed to high voltage. It is thus possible to keep a voltage which is applied at electrical and/or auxiliary components within a wind turbine, within a certain range, where the electrical and/or auxiliary components can operate without damaging them. This may lead to a continuous normal operation without damaging components that are connected to the mains and/or the electrical utility grid.

Exemplary embodiments of devices and methods for protecting a wind turbine against overvoltage are described above in detail. The systems and methods are not limited to the specific embodiments described herein, but rather, components of the systems and/or steps of the methods may be utilized independently and separately from other components and/or steps described herein. Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An overvoltage protection device for protecting a wind turbine against overvoltage, the wind turbine including
    an electrical transformer for transforming electrical power generated by a generator of the wind turbine from a low voltage region to a medium voltage region, the electrical transformer comprising:
        a secondary winding electrically connected to the generator of the wind turbine; and
        a primary winding electrically connected to an electrical utility grid receiving the generated electrical power,
    wherein the overvoltage protection device comprises:
        a detection unit configured to detect overvoltage at the electrical transformer;
        a determination unit configured to determine a counter-current on basis of the detected overvoltage;
        a counter-winding having a winding direction opposite to a winding direction of at least one of the primary winding and the secondary winding; and
        a current driver unit configured to feed the determined counter-current through the counter-winding.

2. The overvoltage protection device according to claim 1, wherein the counter-winding is provided at a primary side of the electrical transformer.

3. The overvoltage protection device according to claim 1, wherein the counter-winding is provided at a secondary side of the electrical transformer.

4. The overvoltage protection device according to claim 1, wherein the electrical transformer is a three-phase transformer and wherein an individual counter-winding is provided for each phase of the electrical transformer.

5. The overvoltage protection device according to claim 1, further comprising a switching unit configured to switch the counter-current to the counter-winding.

6. The overvoltage protection device according to claim 5, wherein the switching unit comprises electrical switches selected from the group consisting of a triac, an IGBT, a bipolar transistor, a thyristor, a MOS-FET, a SiC-JFET, a unipolar transistor, an avalanche-diode, a switching-diode, a Schottky-diode and any combination thereof.

7. A wind turbine comprising:
    an electrical transformer for transforming electrical power generated by a generator of the wind turbine from a low voltage region to a medium voltage region, the electrical transformer comprising:
        a secondary winding electrically connected to the generator of the wind turbine;
        a primary winding electrically connected to an electrical utility grid receiving the generated electrical power; and
        a counter-winding having a winding direction opposite to a winding direction of at least one of the primary winding and the secondary winding;
        a detection unit configured to detect overvoltage at the electical transformer;
        a determination unit configured to determine a counter-current on basis of the detected overvoltage; and
        a current driver unit configured to flow the determined counter-current through the counter-winding.

8. The wind turbine according to claim 7, wherein the counter-winding is provided at a primary side of the electrical transformer.

9. The wind turbine according to claim 7, wherein the counter-winding is provided at a secondary side of the electrical transformer.

10. The wind turbine according to claim 7, wherein the electrical transformer is a three-phase transformer and wherein an individual counter winding is provided for each phase of the electrical transformer.

11. The wind turbine according to claim 7, further comprising a switching unit configured to switch the counter-current to the counter-winding.

12. A method for protecting a wind turbine against overvoltage, the method comprising:
    transforming electrical power generated by a generator of the wind turbine from a low voltage region to a medium voltage region by means of an electrical transformer;
    detecting overvoltage at the electrical transformer;
    determining a counter-current on basis of the detected overvoltage; and
    applying the determined counter-current at the electrical transformer such that the detected overvoltage is reduced to a predetermined voltage level.

13. The method according to claim 12, wherein detecting the overvoltage at the electrical transformer comprises comparing a measured voltage level with a reference voltage level.

14. The method according to claim 12, wherein the counter-current is applied at the electrical transformer within a time delay after an overvoltage event, the time delay being in a range from 0.5 milliseconds to 100 milliseconds.

15. The method according to claim 12, wherein applying the counter-current at the electrical transformer comprises adjusting an amplitude characteristic of the counter-current.

16. The method according to claim 12, wherein an overvoltage is detected if an overvoltage level is in a range from 120% to 1.80% of a nominal voltage at the electrical transformer.

17. The method according to claim 12, wherein applying the counter-current at the electrical transformer comprises providing a pulsed counter-current.

18. The method according to claim 12, wherein applying the counter-current at the electrical transformer comprises applying the counter-current at three phases of the electrical transformer.

19. The method according to claim 18, wherein the counter-current is adjusted individually for the three phases of the electrical transformer.

20. The method according to claim 18, wherein the counter-current is applied at at least one of a primary side and a secondary side of the electrical transformer.

* * * * *